(12) United States Patent
Inoue et al.

(10) Patent No.: US 6,282,065 B1
(45) Date of Patent: Aug. 28, 2001

(54) DISK APPARATUS HAVING AN IMPROVED HEAD CARRIAGE STRUCTURE

(75) Inventors: Kazuhiko Inoue; Atsushi Abe, both of Oume (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 09/330,632

(22) Filed: Jun. 11, 1999

(30) Foreign Application Priority Data

Jun. 12, 1998 (JP) .................................................. 10-165326
Jun. 12, 1998 (JP) .................................................. 10-165327
Jun. 12, 1998 (JP) .................................................. 10-165328

(51) Int. Cl.[7] ....................................................... G11B 5/55
(52) U.S. Cl. ..................................... 360/267.3; 360/267.6
(58) Field of Search .................. 360/266.3, 267.3–267.8, 360/266.6

(56) References Cited

U.S. PATENT DOCUMENTS

| | | | |
|---|---|---|---|
| 4,766,510 | * | 8/1988 | Okita et al. ............................ 360/106 |
| 4,943,876 | * | 7/1990 | Kawahara ............................... 360/106 |
| 5,012,374 | * | 4/1991 | Maeda .................................... 360/106 |
| 5,023,498 | * | 6/1991 | Abe .......................................... 310/71 |
| 5,912,789 | * | 6/1999 | Konno et al. ........................... 360/106 |

\* cited by examiner

Primary Examiner—Robert S. Tupper
(74) Attorney, Agent, or Firm—Anderson, Kill & Olick P.C.

(57) ABSTRACT

A disk apparatus includes a head carriage having a read/write head which reads information from or writes information to a disk, the head carriage provided to support the head thereon such that the head can be positioned to the disk in a radial direction of the disk together with the head carriage. A flexible printed circuit cable is provided to supply a control signal to connection terminals of a carriage drive motor, wherein the flexible printed circuit cable has a first portion, a second portion and a clearance opening therebetween, the first portion being fixed to the outer periphery of the motor and having a corresponding number of through holes through which the connection terminals are passed, and the second portion being folded back from the first portion at an end of the clearance opening such that the connection terminals, projecting from the through holes of the first portion, are located within the clearance opening, causing no interference between the flexible printed circuit cable and the connection terminals.

9 Claims, 15 Drawing Sheets

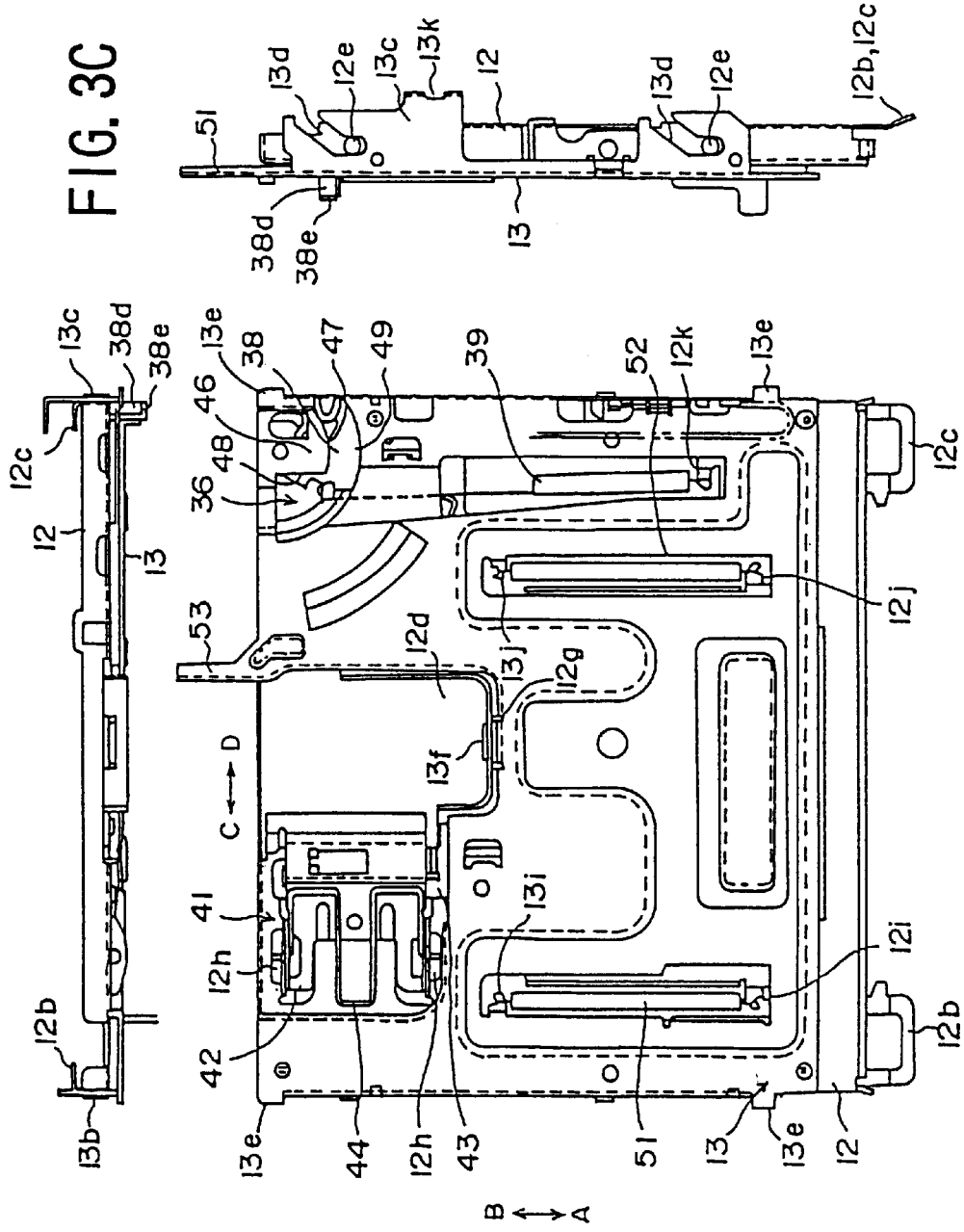

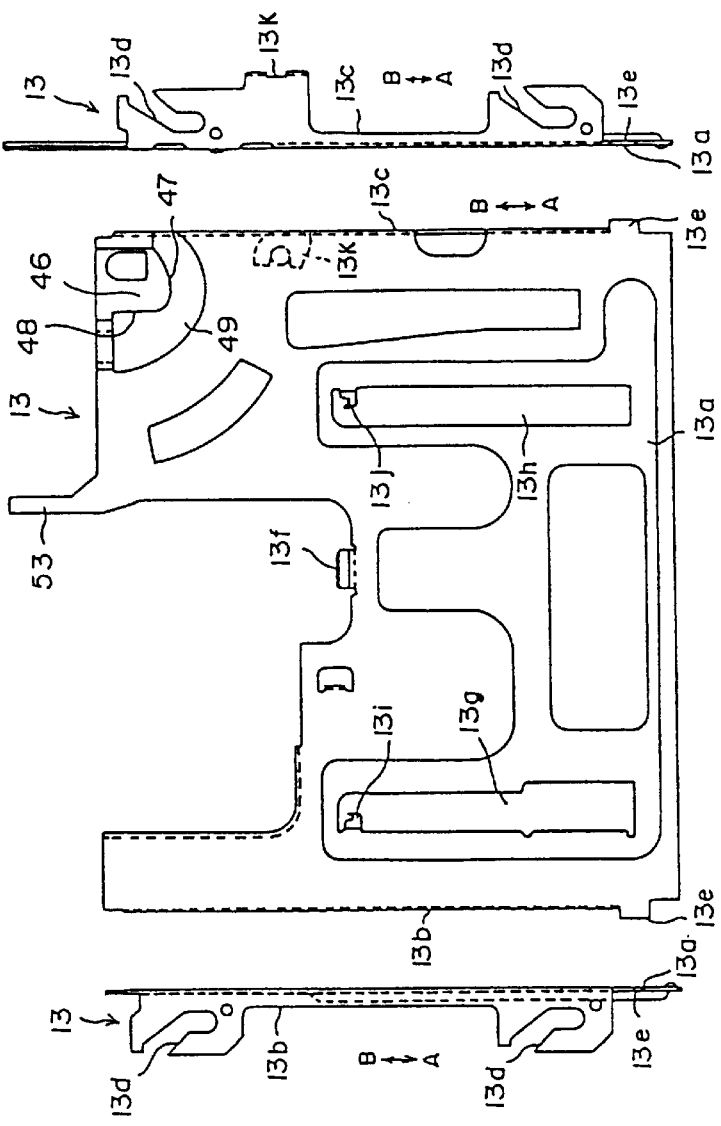

DISK APPARATUS HAVING AN IMPROVED HEAD CARRIAGE STRUCTURE

BACKGROUND OF THE INVENTION

1. Field of the Invention

The present invention relates to a disk apparatus provided with a head carriage device including a read/write head, a head carriage, a carriage drive motor, a guide shaft, and a flexible printed circuit cable. In the disk apparatus of this type, the head carriage is moved along the guide shaft by a force of the carriage drive motor, so that the head on the head carriage is positioned to a disk in its radial direction when reading information from or writing information to the disk.

2. Description of the Related Art

In a magnetic disk apparatus, a flexible-type magnetic disk is inserted therein. In the disk apparatus of this type, a head carriage which carries a read/write head thereon is moved along a guide shaft, so that the read/write head on the head carriage is positioned to the magnetic disk in a radial direction thereof when reading information from or writing information to the magnetic disk.

A typical head carriage device, which is used by a conventional disk apparatus of the above type, includes a head carriage and a lead screw connected to a carriage drive motor. The head carriage is linked to the lead screw, and the lead screw is rotated by the carriage drive motor so that the head carriage is moved relative to the magnetic disk in the radial direction. The head carriage has a connecting pin which is linked to an external thread on the lead screw. When the lead screw is rotated by the carriage drive motor, the head carriage is moved relative to the magnetic disk in the radial direction by a distance proportional to a rotational angle of the lead screw.

The above-mentioned movement of the head carriage relative to the magnetic disk in the radial direction is proportional to a rotational angle of the lead screw, or to a rotational angle of a drive shaft of the carriage drive motor. In order to enable the head on the head carriage to be moved in an entire range from the innermost track to the outermost track of the magnetic disk, it is necessary to suitably adjust the position where the carriage drive motor is installed in the conventional disk apparatus during assembly.

During the assembly of the conventional disk apparatus, the carriage drive motor is temporarily attached to a mounting surface of a frame such that the drive shaft of the motor is freely rotatable with respect to the connecting pin of the head carriage. After the position of the carriage drive motor installed is suitably adjusted, the carriage drive motor is permanently fixed to the mounting surface of the frame by fastening two or more screws.

In the above-described head carriage device, a plurality of connection terminals are provided on the outer periphery of the carriage drive motor, and they are projecting from the outer periphery. During the assembly of the conventional disk apparatus, a flexible printed circuit cable is soldered to the connection terminals of the carriage drive motor so that an electrical connection between the carriage drive motor and a control circuit via the flexible printed circuit cable is established. After the soldering is performed, the flexible printed circuit cable is arranged in a slack condition so as to allow for the positioning of the carriage drive motor to which the cable is soldered. For example, the flexible printed circuit cable is folded back at its end in a U-shaped formation in order to keep the cable in a slack condition.

However, in the conventional disk apparatus, the flexible printed circuit cable arranged in the slack condition may interfere with the connection terminals on the outer periphery of the carriage drive motor, which is detrimental to the surface of the flexible printed circuit cable.

A conceivable measure to eliminate the interference between the flexible printed circuit cable and the connection terminals is to shorten the connection terminals of the carriage drive motor by cutting off the edges of the connection terminals. However, if this measure is taken, it is difficult to ensure good quality of soldering of the flexible printed circuit cable and the connection terminals of the carriage drive motor. Further, if the measure is taken, an additional assembly operation to cut off the leading edges of the connection terminals is required. It is difficult to maintain efficiency of assembly operations needed for the conventional disk apparatus at the desired level.

SUMMARY OF THE INVENTION

An object of the present invention is to provide an improved disk apparatus in which the above-described problems are eliminated.

Another object of the present invention is to provide a disk apparatus having an improved head carriage device which safely prevents the interference between a flexible printed circuit cable and connection terminals of a carriage drive motor while ensuring good quality of soldering of the flexible printed circuit cable and the connection terminals with the efficiency of assembly operations needed for the disk apparatus being maintained at the desired level.

Still another object of the present invention is to provide a disk apparatus having an improved head carriage device which allows the disk apparatus to have a small size while ensuring the movement of the head of the head carriage in the entire range from the innermost track to the outermost track of the disk.

A further object of the present invention is to provide a disk apparatus having an improved head carriage device which allows the disk apparatus to have a small size while ensuring a mounting space where a retaining device for retaining the guide shaft on the frame is mounted.

The above-mentioned objects of the present invention are achieved by a disk apparatus including: a head carriage which has a read/write head which reads information from or writes information to a disk, the head carriage provided to support the head thereon such that the head can be positioned to the disk in a radial direction of the disk together with the head carriage; a carriage drive motor which is provided to move the head carriage in the radial direction of the disk in accordance with a control signal, the carriage drive motor having a number of connection terminals on an outer periphery of the motor; a guide shaft which is provided to guide the movement of the head carriage; and a flexible printed circuit cable which is provided to supply the control signal to the connection terminals of the carriage drive motor, wherein the flexible printed circuit cable has a first portion, a second portion and a clearance opening therebetween, the first portion being fixed to the outer periphery of the motor and having a corresponding number of through holes through which the connection terminals are passed, and the second portion being folded back from the first portion at an end of the clearance opening such that the connection terminals, projecting from the through holes of the first portion, are located within the clearance opening, causing no interference between the flexible printed circuit cable and the connection terminals.

The above-mentioned objects of the present invention are achieved by a disk apparatus including: a frame; a head carriage which has a read/write head which reads information from or writes information to a disk, the head carriage provided to support the head thereon such that the head can be positioned to the disk in a radial direction of the disk together with the head carriage; a carriage drive motor which is provided to move the head carriage in the radial direction of the disk in accordance with a control signal; a guide shaft which is provided to guide the movement of the head carriage, the guide shaft having a first end extended to an inner position of the disk; and a guide shaft support which is provided to support the guide shaft at the first end, the guide shaft support being arranged at a position adjacent to the inner position of the disk.

The above-mentioned objects of the present invention are achieved by a disk apparatus including: a frame; a head carriage which has a read/write head which reads information from or writes information to a disk, the head carriage provided to support the head thereon such that the head can be positioned to the disk in a radial direction of the disk together with the head carriage; a carriage drive motor which is provided to move the head carriage in the radial direction of the disk in accordance with a control signal; a guide shaft which is provided to guide the movement of the head carriage; and a retaining device which is provided to retain the guide shaft on a top surface of the frame, the retaining device including a pressing member having a main part and a pair of arm parts, the arm parts being angled from the main part and passed through the frame so as to extend upward from the top surface of the frame.

In the disk apparatus of the present invention, the connection of the flexible printed circuit cable and the carriage drive motor causes no interference between the flexible printed circuit cable and the connection terminals of the carriage drive motor. The disk apparatus of the present invention is effective in safely preventing the interference between the flexible printed circuit cable and the connection terminals of the carriage drive motor as in the conventional disk apparatus. It is unnecessary to shorten the connection terminals of the carriage drive motor by cutting off the connection terminal edges. In addition, it is possible for the disk apparatus of the present invention to ensure good quality of soldering of the flexible printed circuit cable and the connection terminals with the efficiency of assembly operations needed for the disk apparatus being maintained at the desired level.

Further, in the disk apparatus of the present invention, the first end of the guide shaft and the guide shaft support are extended to an inner position of the disk. Even when the head carriage is moved to the innermost track of the disk, the head carriage can be stably supported by the guide shaft support. The head carriage structure of the present invention is effective in reducing the longitudinal length of the head carriage. Hence, the head carriage structure of the present invention allows the disk apparatus to have a small size while ensuring the movement of the head of the head carriage in the entire range from the innermost track to the outermost track of the disk.

Further, in the disk apparatus of the present invention, the retaining device is provided on the back surface of the frame at the position corresponding to the position of the head carriage on the top surface of the frame. The retaining device includes the pressing member having the arm parts which are passed through the frame so as to extend upward from the top surface of the frame. The pressing member presses the guide shaft on the guide shaft bases such that the guide shaft is pressed on the raised walls by the arm parts. It is unnecessary to provide a mounting space where the retaining device is mounted, on the top surface of the frame at a side position of the head carriage where the guide shaft is provided. Therefore, the head carriage structure of the present invention is effective in providing a disk apparatus having a small size while ensuring a mounting space where a retaining device for retaining the guide shaft on the frame is mounted.

BRIEF DESCRIPTION OF THE DRAWINGS

Other objects, features and advantages of the present invention will be more apparent from the following detailed description when read in conjunction with the accompanying drawings in which:

FIG. 3A, FIG. 3B, and FIG. 3C are views of the slider and the holder which are attached together;

FIG. 7A, FIG. 7B, FIG. 7C and FIG. 7D are views of the slider in the disk apparatus;

DETAILED DESCRIPTION OF THE PREFERRED EMBODIMENT

A description will now be given of the preferred embodiment of the present invention with reference to the accompanying drawings.

Figure 1:
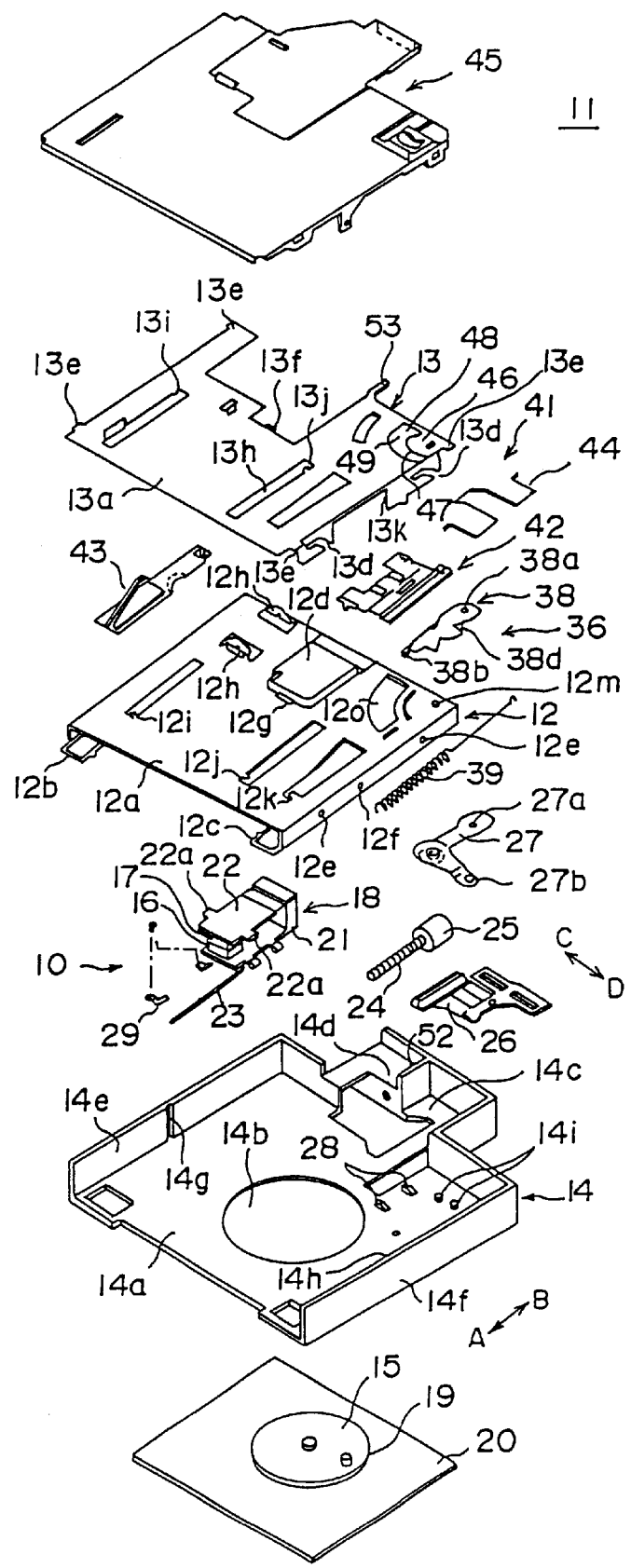
FIG. 1 is a perspective exploded view of a disk apparatus embodying the present invention.
Figure 2:
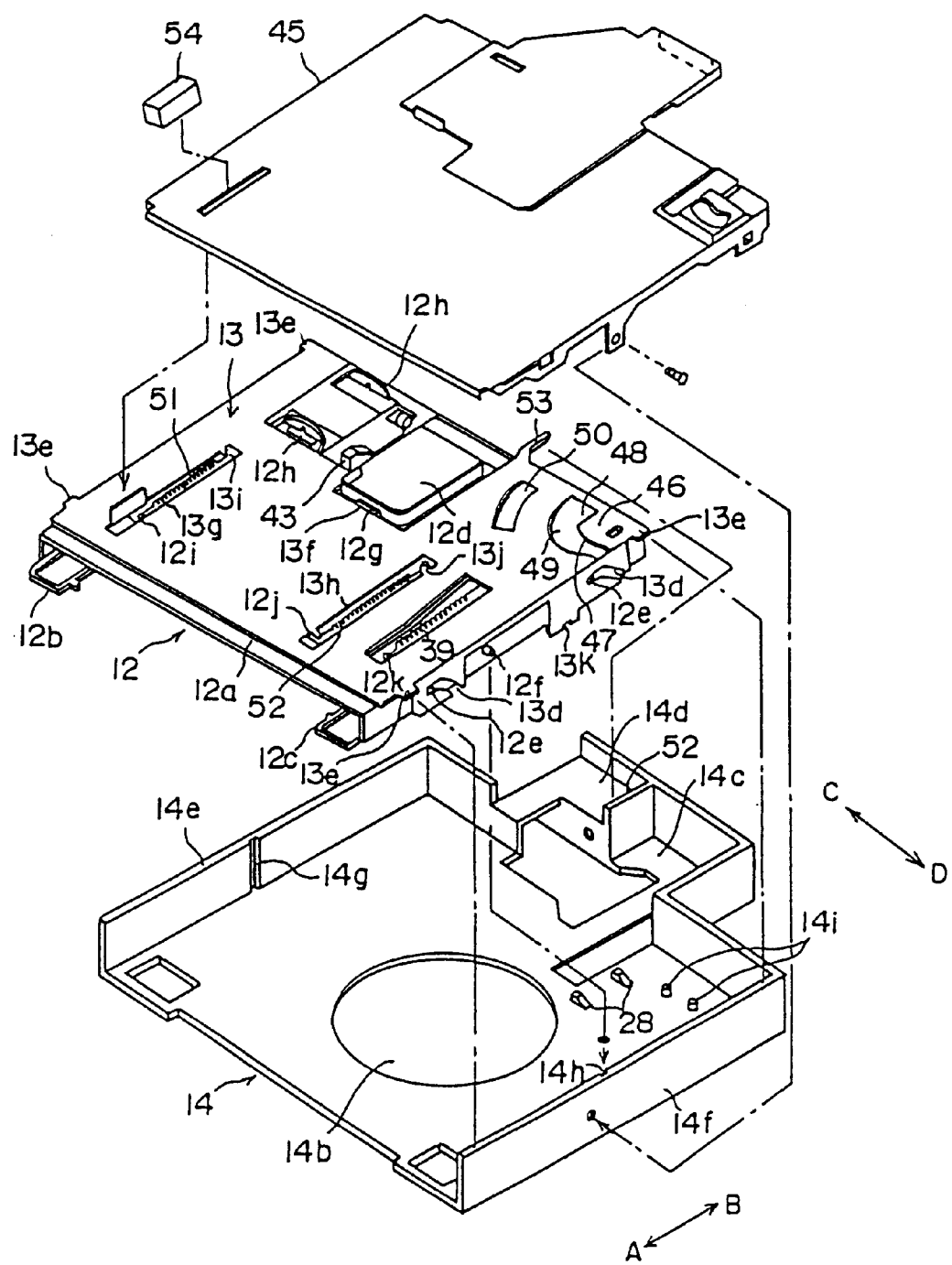
FIG. 2 is a perspective exploded view of a cover, a slider, a holder and a frame in the disk apparatus.

FIG. 1 is a perspective exploded view of a magnetic disk apparatus 11 embodying the present invention. FIG. 2 is a perspective exploded view of a cover, a slider, a holder and a frame in the disk apparatus 11. FIG. 3A, FIG. 3B and FIG. 3C are, respectively, a top view, a rear view and a side view of the slider and the holder which are attached together.

In the accompanying drawings, including FIG. 1 through FIG. 3C, the arrows A and B indicate ejection and insertion directions of the disk apparatus 11 which are perpendicular to the front and rear of the disk apparatus 11, and the arrows C and D indicate left and right directions of the disk apparatus 11 which are perpendicular to the left and right sides of the disk apparatus 11. Hereinafter, the ejection and insertion directions of the disk apparatus 11 indicated by the arrows A and B will be called the longitudinal directions, and the left and right directions of the disk apparatus 11 indicated by the arrows C and D will be called the lateral directions.

As shown in FIG. 1 through FIG. 3C, the disk apparatus 11 includes a disk holder 12, a slider 13 and a frame 14. The disk holder 12 and the slider 13 are connected with each other and they are movably supported on the frame 14. A disk cartridge (not shown) in which a magnetic disk is contained is inserted into or withdrawn from the disk holder 12. The slider 13 is moved to the frame 14 in the longitudinal directions, and the disk holder 12 is lifted or lowered with respect to the frame 14 by the connection of the disk holder 12 and the slider 13.

In the disk apparatus 11, a head carriage device 10 is provided on the frame 14. The head carriage device 10 includes a head carriage 18, a guide shaft 23, a lead screw 24, and a carriage drive motor 25. Read/write heads 16 and 17 are supported on the head carriage 18 such that the read/write heads 16 and 17 can be positioned to the disk in a radial direction of the disk together with the head carriage 18. The carriage drive motor 25 is provided to move the head carriage 18 in a radial direction of the disk. The guide shaft 23 is provided to guide the movement of the head carriage 18. The lead screw 24 is rotated by the carriage drive motor 25 to move the head carriage 18 via a connection of the head carriage 18 and the lead screw 24.

The slider 13 is provided on the disk holder 12 such that the slider 13 is movable in one of the longitudinal directions A and B (or in a radial direction of the disk). When the disk cartridge is inserted into the disk holder 12, the slider 13 is moved in the direction A so that the disk holder 12 is lowered from an insertion/ejection position to a disk-loaded position.

The disk holder 12 includes a top plate 12a and a pair of cartridge guides 12b and 12c. The cartridge guides 12b and 12c are formed on sides of the top plate 12a by bending down the top plate 12a along the sides of the top plate 12a. Internal space of the disk holder 12 surrounded by the top plate 12a and the cartridge guides 12b and 12c forms a cartridge insertion opening. An opening 12d in which the head carriage 18 can be moved is provided at a rear middle portion of the top plate 12a. A pair of supporting lugs 12h are provided on the left side of the opening 12d. A lift arm 42 is rotatably supported by the supporting lugs 12h. A fitting hole 12g is provided in the middle of the top plate 12a in front of the opening 12d. The slider 13 is connected with the disk holder 12 through the fitting hole 12g.

The slider 13 includes a flat plate 13a and a pair of side walls 13b and 13c. The side walls 13b and 13c are formed on sides of the flat plate 13a by bending down the flat plate 13a along the sides of the flat plate 13a. The flat plate 13a is provided to movable on the disk holder 12. In the side walls 13b and 13c, a plurality of slanted holes 13d are formed. The disk holder 12 includes a plurality of fitting pins 12e on sides of the disk holder 12. The fitting pins 12e of the disk holder 12 are fitted to the slanted holes 13d of the slider 13. The slider 13 includes contact parts 13e at the four corners of the flat plate 13a. The contact parts 13e are brought into contact with the top of side walls 14e and 14f of the frame 14. The slider 13 further includes a fitting lug 13f in the middle of the flat plate 13a at a position that corresponds to the position of the fitting hole 12g in the disk holder 12. When the disk cartridge is ejected from the disk holder 12, the fitting lug 13f of the slider 13 is fitted to the fitting hole 12g of the disk holder 12.

In the disk apparatus 11 of the present embodiment, the fitting lug 13f which is fitted to the fitting hole 12g and projects toward the inside of the disk holder 12 acts to prevent the leading edge of the disk cartridge from hitting the read/write head 16 on the head carriage 14 when the disk cartridge is inserted into the disk holder 12.

The flat plate 13a of the slider 13 includes an opening 13g and an opening 13h which extend in the longitudinal directions A and B. The slider 13 includes a hook 13i provided at a rear end of the opening 13g and a hook 13j provided at a rear end of the opening 13h. A coil spring 51 is connected at one end to the hook 13i of the slider 13 and inserted in the opening 13g. A coil spring 52 is connected at one end to the hook 13j of the slider 13 and inserted in the opening 13h. The disk holder 12 includes a hook 12i provided at a front end of an opening (corresponding to the opening 13g) of the top plate 12a and a hook 12j provided at a front end of an opening (corresponding to the opening 13h) of the top plate 12a. The coil spring 51 is connected at the other end to the hook 12i of the disk holder 12. The coil spring 52 is connected at the other end to the hook 12j of the disk holder 12. Hence, the slider 13 is pulled in the direction A relative to the disk holder 12 by the actuating force of the coil springs 51 and 52.

Figure 4B:
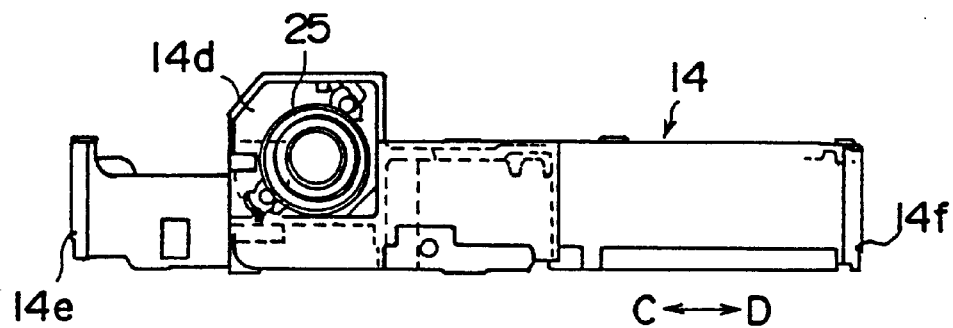
FIG. 4A and FIG. 4B are views of the frame in the disk apparatus.
Figure 4A:
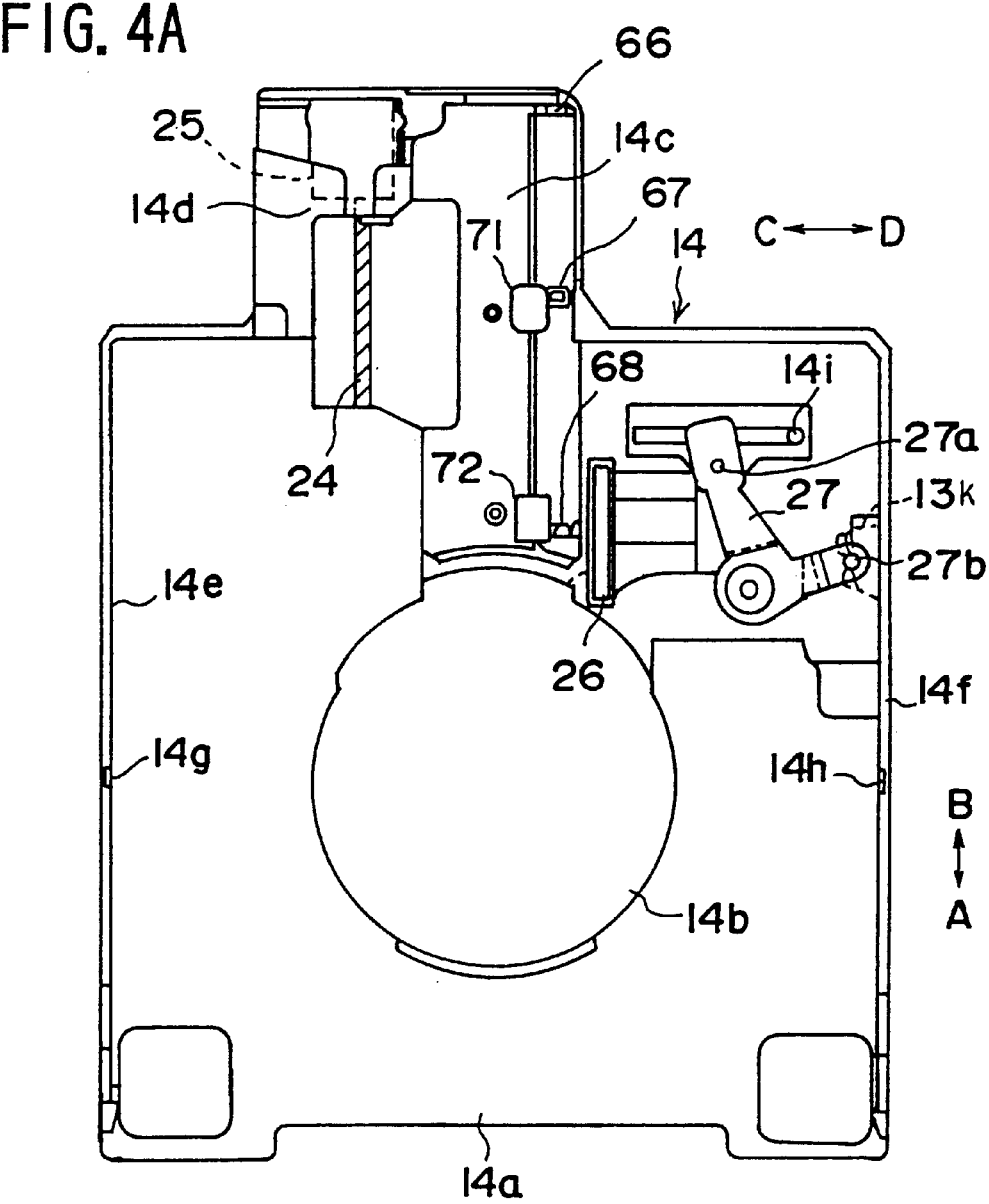

FIG. 4A and FIG. 4B are a top view and a rear view of the frame 14 in the disk apparatus 11.

As shown in FIG. 1 through FIG. 4B, the frame 14 includes a main surface 14a and a round opening 14b in the middle of the main surface 14a. A turntable 15 (not shown in FIG. 4A) is inserted in the round opening 14b. The frame 14 includes a carriage mounting portion 14c and a motor mounting portion 14d which are provided at rear positions of the main surface 14a. The head carriage 18 on which the read/write heads 16 and 17 are supported is attached to the carriage mounting portion 14c such that the head carriage 18 is movable in the longitudinal directions A and B. The carriage drive motor 25 which is provided to rotate the lead screw 24 is attached to the motor mounting portion 14d.

In the frame 14, a rectangular region on the left side of the motor mounting portion 14d and a rectangular region on the right side of the carriage mounting portion 14c are cut off. The frame 14 is configured such that the motor mounting portion 14d and the carriage mounting portion 14c are projecting from the rear end of the main surface 14a in the direction B.

In the frame 14, a side wall 14e and a side wall 14f are provided on the sides of the main surface 14a. A guide groove 14g is provided in the middle of the side wall 14e, and a guide groove 14h is provided in the middle of the side wall 14f. The guide grooves 14g and 14h are provided to guide the vertical movements of the disk holder 12. The disk holder 12 includes a pair of pins 12f on the side walls of the disk holder 12, and the pins 12f are fitted to the guide grooves 14g and 14h of the frame 14. As shown in FIG. 1, the turntable 15 and a disk rotating motor 19 are provided on a printed circuit board 20, and the printed circuit board 20 is attached to the back surface of the frame 14.

As shown in FIG. 1, the head carriage 18 includes a carriage base 21 and a head arm 22. The read/write head 16 is supported on the front end of the carriage base 12. The rear/write head 17 is supported on the front end of the back surface of the head arm 22. The head arm 22 is rotatably supported on the rear end of the carriage base 22.

In the disk apparatus 11, the guide shaft 23 and the lead screw 24 extend in the longitudinal directions A and B, and the guide shaft 23 is provided to guide the movement of the head carriage 18. The lead screw 24 is rotated by the carriage drive motor 25, and the head carriage 18 is moved in one of the longitudinal directions A and B (or in a radial direction of the disk) via the connection of the head carriage 18 and the lead screw 24 by a distance according to a rotated angle of the lead screw 24. The guide shaft 23 is retained on the main surface 14a of the frame 14 by a plate-form retainer (not shown). A fitting part is provided on the right side of the carriage base 21, and the guide shaft 23 is passed through the fitting part so that the head carriage 18 is movable along the guide shaft 23. The head carriage 18 includes a projecting portion (not shown in FIG. 4A) on the left side of the carriage base 21, and this projecting portion includes a connecting pin (not shown in FIG. 4A). The lead screw 24 is linked to the connecting pin of the projecting portion of the head carriage 18. Hence, when the lead screw 24 is rotated by the carriage drive motor 25, the head carriage 18 is moved in one of the longitudinal directions A and B via the connection of the head carriage 18 and the lead screw 24 by a distance according to a rotated angle of the lead screw 24.

As indicated by the dotted line in FIG. 4A, the carriage drive motor 25 is attached to the back surface of the motor mounting portion 14d of the frame 14. When the lead screw 24 is rotated by the carriage drive motor 25, the head carriage 18 is moved in one of the longitudinal directions A and B via the connection of the head carriage 18 and the lead screw 24. Hence, the read/write heads 16 and 17 on the head carriage 18 can be positioned to the disk in a radial direction of the disk together with the head carriage 18.

In the main surface 14a of the frame 14, a pin 14i is raised. A protector 26 is movably supported on the main surface 14a, and the protector 26 is connected to the pin 14i such that the protector 26 is movable in one of the lateral directions C and D. The protector 26 is provided to prevent the leading edge of the disk cartridge from hitting the read/write head 16 on the head carriage 14 when the disk cartridge is inserted into the disk holder 12. An L-shaped link 27 is connected at one end to the protector 26 by a pin 27a, and connected at the other end to a connecting part 13k of the slider 13 by a pin 27b.

Before the disk cartridge is inserted into the disk holder 12, the protector 26 is arranged at a location adjacent to the side of the read/write head 16 of the head carriage 18. As shown in FIG. 1, a pair of raised parts 28 are provided on the main surface 14a of the frame 14. The protector 26 is arranged on the raised parts 28 of the main surface 14a so that the protector 26 is lifted at a height above the read/write head 16 of the head carriage 18. Hence, when the disk cartridge is inserted into the disk holder 12, the leading edge of the disk cartridge interferes with the protector 26, and it is possible that the protector 26 prevents the leading edge of the disk cartridge from hitting the read/write head 16 on the head carriage 14.

When the disk cartridge is inserted into the disk holder 12, the slider 13 is moved in the direction A away from the read/write head 16 of the head carriage 18. The protector 26 is moved in the direction D by the movement of the slider 13, and the protector 26 is disconnected from the raised parts 28 and lowered from the above height. The read/write head 16 of the head carriage 18 is brought into contact with the disk in the disk cartridge via an access opening of the disk cartridge.

Figure 5:
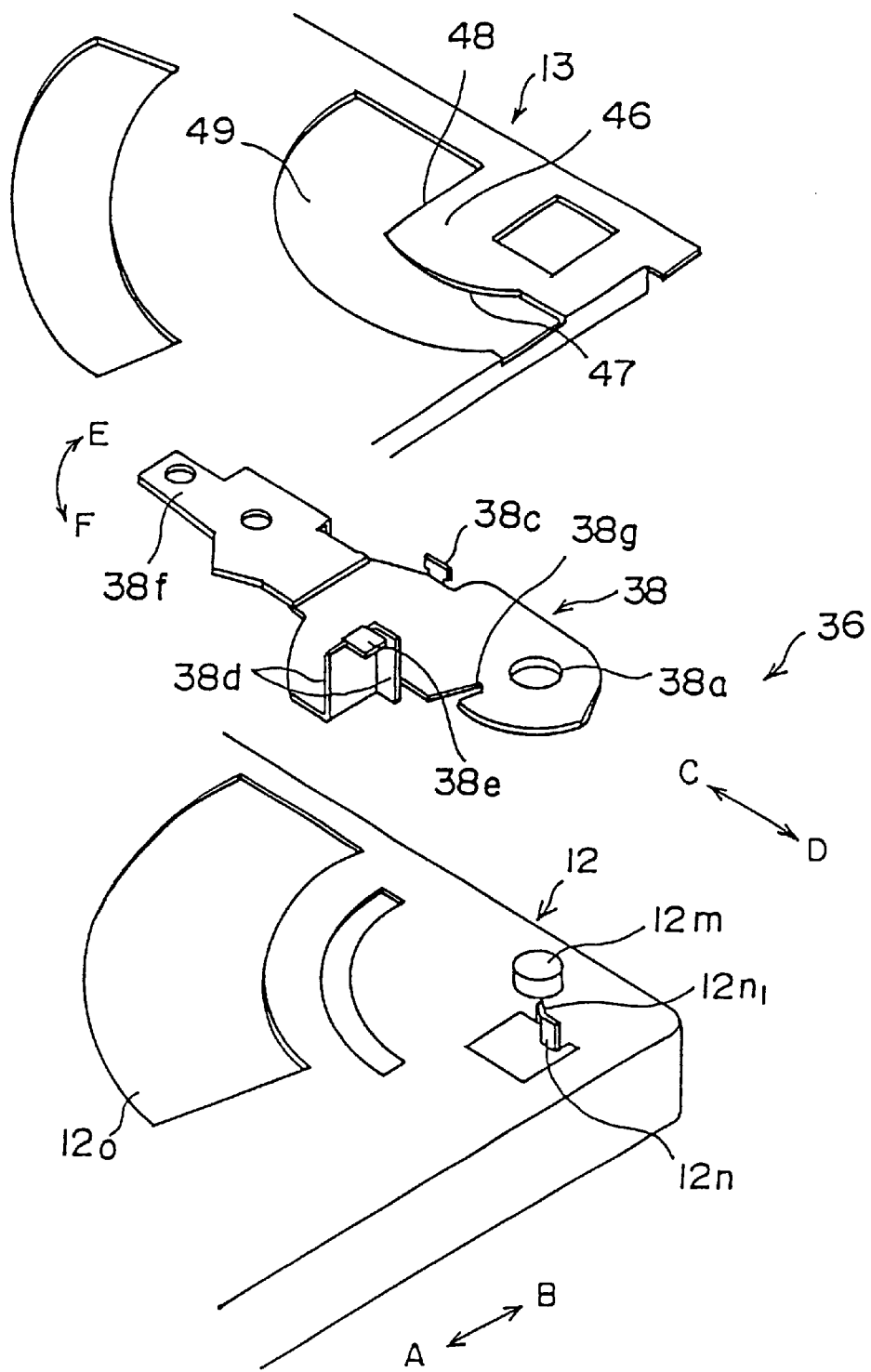
FIG. 5 is a perspective exploded view of a latch device in the disk apparatus.

FIG. 5 is a perspective exploded view of a latch device 36 in the disk apparatus 11.

As shown in FIG. 1 and FIG. 5, the latch device 36 is provided at the rear right corner of the disk holder 12, and the latch device 36 acts to lock the disk holder 12 to the slider 13. The latch device 36 includes a latch lever 38, a coil spring 39 and a cam part 46. The latch lever 38 is rotatably supported on the top of the disk holder 12 at the rear right corner. The coil spring 39 exerts an actuating force on the latch lever 38 so as to rotate the latch lever 38 counterclockwise. The cam part 46 is formed on the flat plate 13a of the slider 13.

Figure 6A:
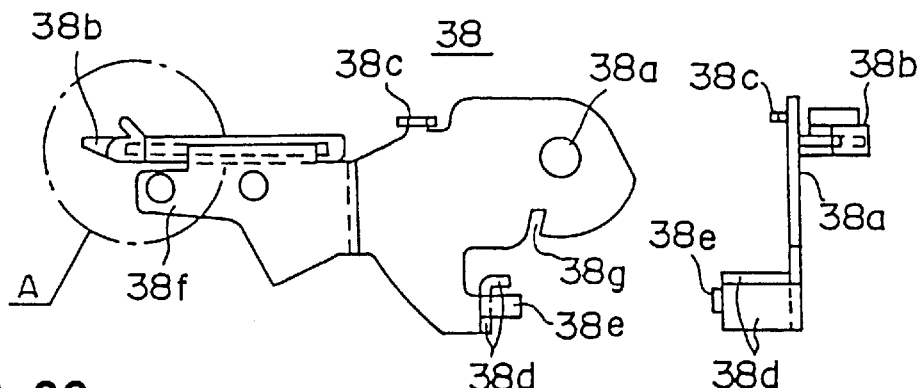
FIG. 6A, FIG. 6B, FIG. 6C, FIG. 6D and FIG. 6E are diagrams showing a latch lever in the latch device.
Figure 6B:
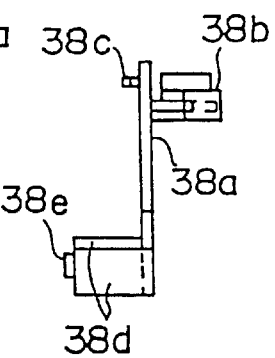
Figure 6C:
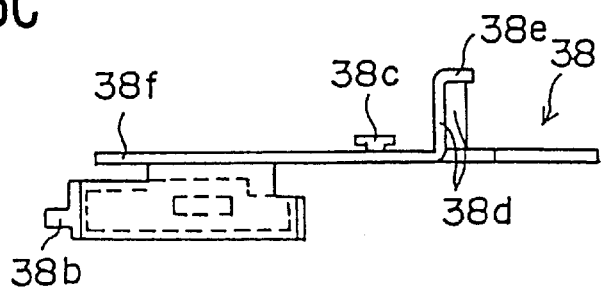
Figure 6D:
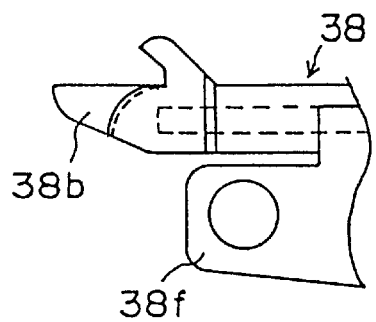
Figure 6E:
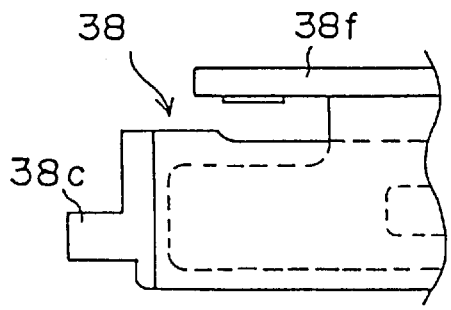

FIG. 6A, FIG. 6B, FIG. 6C, FIG. 6D and FIG. 6E show a configuration of the latch lever 38 in the latch device 36. FIG. 6A, FIG. 6B and FIG. 6C are a top view, a side view and a rear view of the latch lever 38. FIG. 6D and FIG. 6E are an enlarged top view and an enlarged side view of a portion "A" of the latch lever 38 indicated by the one-dot chain line in FIG. 6A.

As shown in FIG. 6A through FIG. 6E, the latch lever 38 has a shaft hole 38a at one end and a shutter opening lug 38b at the other end. The disk holder 12 has a shaft 12m raised at the rear right corner of the disk holder 12. The shaft 12m is fitted to the shaft hole 38a. The shutter opening lug 38b acts to open a shutter (not shown) of the disk cartridge when it is inserted into the disk holder 12, so as to allow the read/write head 16 to have access to the disk of the disk cartridge via the access opening. The latch lever 38 includes a hook 38c at an intermediate portion of the latch lever 38, and a connecting part 38d at a position opposite to the hook 38c. The coil spring 39 is connected at one end to the hook 38c of the latch lever 38, and connected at the other end to the hook 12k on the top plate 12a of the disk holder 12. The connecting part 38d is brought into contact with the cam part 46 of the slider 13.

In the latch lever 38, a hook 38e is provided on the top of the connecting part 38d by bending the connecting part 38d. The hook 38e acts to prevent the slider 13 from being disconnected from the latch lever 38. A height restricting part 38f is provided above the shutter opening lug 38b, and the height restricting part 38f acts to hold the shutter opening lug 38b at a height in conformity with the position of the disk cartridge when inserted in the disk holder 12.

As shown in FIG. 5, the shaft hole 38a of the latch lever 38 is fitted onto the shaft 12m of the disk holder 12, and the latch lever 38 is rotatable around the shaft 12m in rotational directions indicated by the arrows E and F in FIG. 5. A latch lever retaining part 12n is provided on the disk holder 12 at a position adjacent to the shaft 12m. The latch lever retaining part 12n is connected to a groove 38g of the latch lever 38, and acts to prevent the upward movement of the latch lever 38 from the disk holder 12. A lug 12n1 is provided on the top of the latch lever retaining part 12n, and the lug 12n1 acts to prevent the latch lever 38 from being separated from the disk holder 12. The disk holder 12 includes a fan-shaped hole 12o provided in the top plate 12a, and the shutter opening lug 38b of the latch lever 38 is passed through the hole 12o, so that the shutter opening lug 38b can open the shutter of the disk cartridge when it is inserted into the disk holder 12.

As shown in FIG. 1 and FIG. 3A, a head arm lifting device 41 is provided on the top of the disk holder 12. When no disk cartridge is inserted into the disk holder 12, the head arm lifting device 41 acts to hold the head arm 22 at a raised position where the read/write head 17 on the head arm 22 of the head carriage 18 does not interfere with the disk cartridge in the disk holder 12. The head arm lifting device 41 includes a lift arm 42, a lifter 43 and a pressing spring 44. The lift arm 42 is brought into contact with the back surface of the head arm 22. The lifter 43 acts to lift the lift arm 42 to the raised position when no disk cartridge is inserted into the disk holder 12. The pressing spring 44 exerts a pressing force on the lift arm 42 so as to press the lift arm 42 in the downward direction.

The head carriage 18 includes a pair of lugs 22a projecting from the sides of the head arm 22. In the head arm lifting device 41, the lift arm 42 is brought into contact with the back surfaces of the lugs 22a of the head arm 22. The lift arm 42 is rotatably supported by the pressing spring 44 such that the lift arm 42 is vertically rotatable around the ends of the pressing spring 44. The lifter 43 is provided below the lift arm 42, and the lifter 43 is moved in one of the longitudinal directions A and B by the movement of the slider 13. When no disk cartridge is inserted, the lifter 43 acts to press the lift arm 42 in the upward direction. The lifter 43 in this condition acts to lift the lift arm 42 to the raised position. The head arm 22 is vertically rotated to the up position by the lift arm 42 so that the read/write head 17 on the head arm 22 of the head carriage 18 does not interfere with the disk cartridge in the disk holder 12.

When the disk cartridge is inserted into the disk holder 12, the slider 13 is moved in the direction A, and the lifter 43 is separated from the lift arm 42 by the movement of the slider 13. The disk holder 12 is lowered from the insertion/ejection position to the disk-loaded position while the lifting force of the lifter 43 to lift the lift arm 42 to the raised position is canceled. The head arm 22 is vertically rotated to the down position so that the read/write head 17 on the head arm 22 of the head carriage 18 has access to the disk of the disk cartridge in the disk holder 12. The disk of the disk cartridge in the disk holder 12 is interposed between the read/write head 16 and the read/write head 17 of the head carriage 18.

As described above, the lift arm 42 is rotatably supported by the supporting lugs 12h on the top plate 12a of the disk holder 12. The supporting lugs 12h are provided to extend in the directions C and D, and the lift arm 42 is vertically rotatable in the plane perpendicular to the longitudinal directions A and B.

As shown in FIG. 1 and FIG. 2, a cover 45 is provided on the slider 13 so that the disk apparatus 11 is enclosed between the cover 45 and the frame 14. The cover 45 is attached to the frame 14 by fastening screws to the side walls of the frame 14. The lifting of the slider 13 upward from the disk holder 12 is prevented by the cover 45, and the movement of the slider 13 in the longitudinal directions A and B is guided by the cover 45.

FIG. 7A, FIG. 7B, FIG. 7C and FIG. 7D are a top view, a left side view, a right side view and a front view of the slider 13 in the disk apparatus 11.

As shown in FIG. 1 through FIG. 7D, in the slider 13, the cam part 46 is provided at the right rear corner of the flat plate 13a. The connecting part 38d of the latch lever 38 which is provided between the slider 13 and the disk holder 12 is connected to the cam part 46. The cam part 46 includes an arc-like portion 47 and a straight portion 48. When the latch lever 38 is rotated around the shaft 12m during the insertion of the disk cartridge to the disk holder 12, the connecting part 38d is moved along the line of the arc-like portion 47. After the insertion of the disk cartridge to the disk holder 12 is complete, the connecting part 38d passes through the arc-like portion 47 and is moved along the straight portion 48.

Further, in the flat plate 13a of the slider 13, a fan-shaped hole 49 is provided at a position adjacent to the cam part 46. The connecting part 38d of the latch lever 38 is passed through the fan-shaped hole 49 and brought into contact with the cam part 46 of the slider 13.

Further, in the slider 13, a contact part 53 is provided at a rear end portion of the flat plate 13a, and the contact part 53 is projecting from the rear end of the flat plate 13a in the direction B. A guide wall 52 which extends in the longitudinal directions A and B is provided in the frame 14 between the carriage mounting portion 14c and the motor mounting portion 14d. When the slider 13 is moved in one of the longitudinal directions A and B, the contact part 53 is brought into contact with the guide wall 52. The contact part 53 acts to guide the movement of the slider 13 and to prevent the rotational movement of the slider 13 when the disk cartridge is ejected from the disk holder 12.

Figure 8:
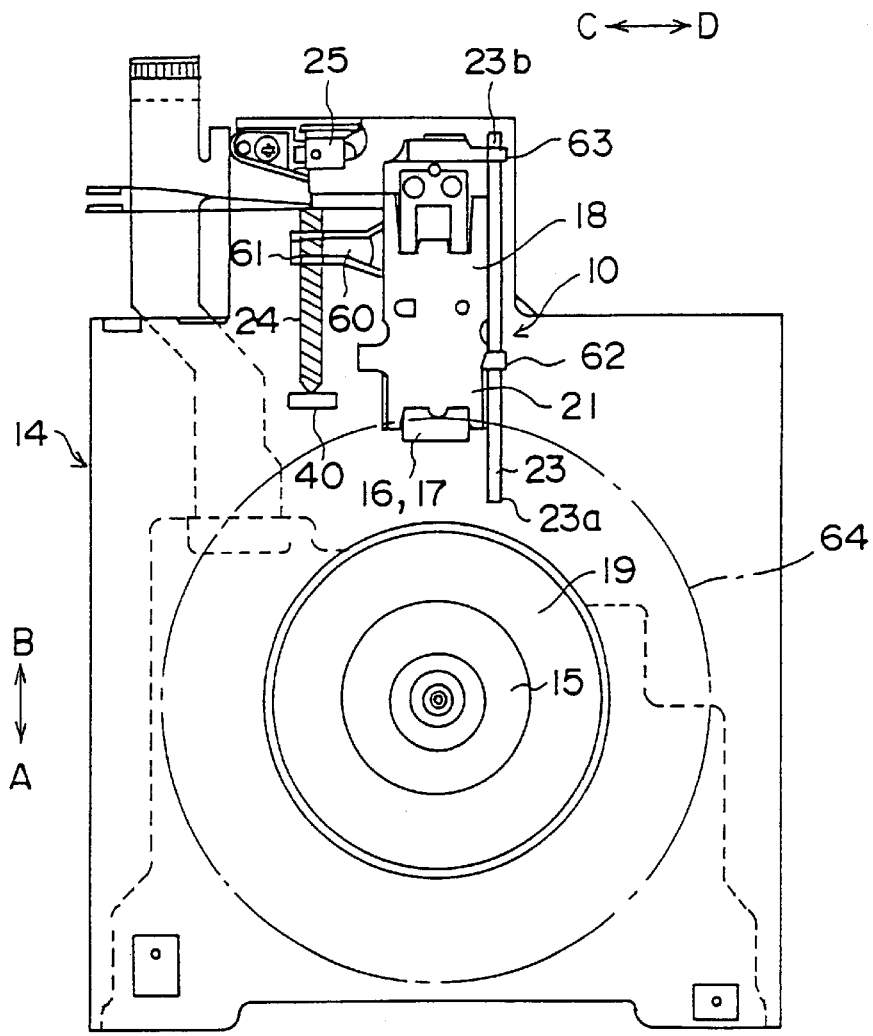
FIG. 8 is a top view of the frame.

FIG. 8 is a top view of the frame 14 in the disk apparatus 11.

As shown in FIG. 8, the lead screw 24 is linked to a rotating shaft of the carriage drive motor 25, and the lead screw 24 is rotatably supported at the leading edge by a lead screw support 40. The head carriage 18 includes a projecting portion 60 on the left side of the carriage base 21, and the projecting portion 60 includes a connecting pin 61 at the end of the projecting portion 60. The lead screw 24 is linked at its intermediate portion to the connecting pin 61 of the projecting portion 60. The connecting pin 61 is fixed to the projecting portion 60 such that the connecting pin 61 is engaged with the external thread of the lead screw 24.

In the head carriage 18, as shown in FIG. 8, a guide shaft support 62 and a guide shaft support 63 are provided on the right side of the carriage base 21. A magnetic disk 64, which is contained in the disk holder 12, is indicated by the one-dot chain line in FIG. 8. The guide shaft 23 has a first end 23a at the front end of the guide shaft and a second end 23b at the rear end of the guide shaft 23. The first end 23a of the guide shaft 23 is extended to an inner position of the disk 64. The guide shaft 23 is fitted to the guide shaft supports 62 and 63 such that the head carriage 18 is movable along the guide shaft 23 in one of the longitudinal directions A and B. When the lead screw 24 is rotated by the carriage drive motor 25, the head carriage 18 is moved in one of the longitudinal directions A and B via the connection of the head carriage 18 and the lead screw 24 by a distance according to a rotated angle of the lead screw 24.

As previously described, in order to enable the read/write heads 16 and 17 on the head carriage 18 to be moved in the entire range from the innermost track to the outermost track of the disk of the disk cartridge, it is necessary to suitably adjust the position where the carriage drive motor 25 is installed in the frame 14 during assembly of the disk apparatus 11.

Figure 9:
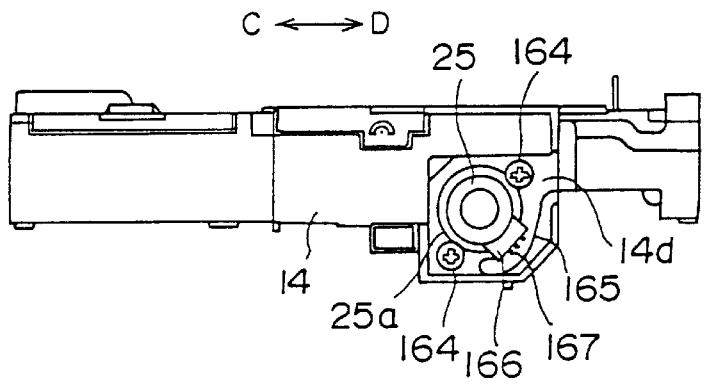
FIG. 9 is a rear view of the frame on which a carriage drive motor is mounted.
Figure 10:
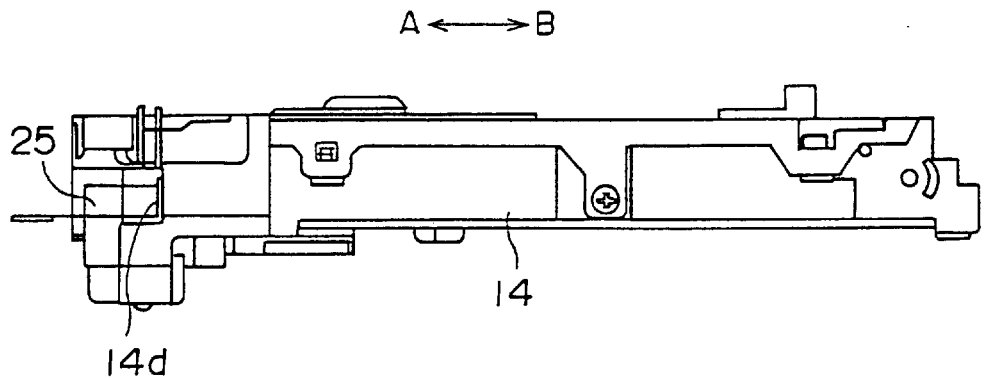
FIG. 10 is a left side view of the frame.
Figure 11:
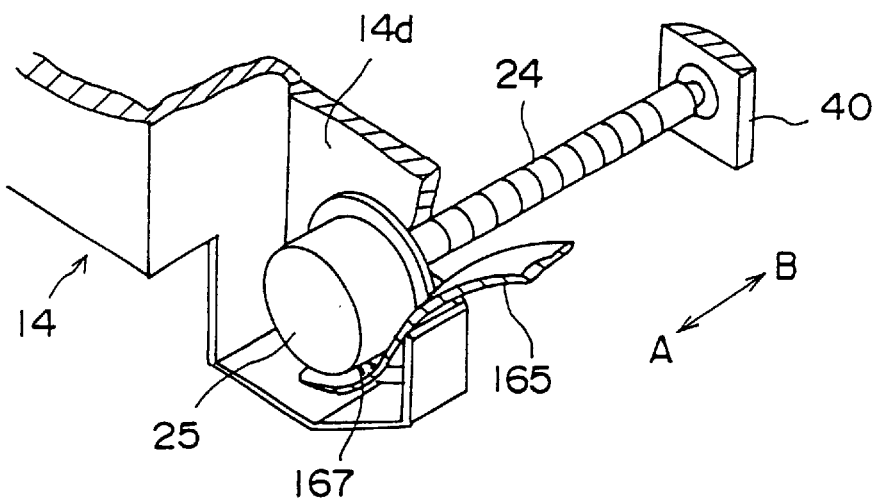
FIG. 11 is a perspective view of the carriage drive motor which is mounted on the frame.

FIG. 9 is a rear view of the frame 14 on which the carriage drive motor 25 is mounted. FIG. 10 is a left side view of the frame 14. FIG. 11 is a perspective view of the carriage drive motor 25 which is mounted on the frame 14.

As shown in FIG. 9 through FIG. 11, the carriage drive motor 25 is fixed to the motor mounting portion 14d of the frame 14 by fastening two screws 164. The carriage drive motor 25 has a flange 25a which is radially projecting from the rotating shaft of the carriage drive motor 25. The screws 164 are fastened to clamp the flange 25a on the motor mounting portion 14d. If the screws 164 are loosened, the carriage drive motor 25 can be moved in a rotational direction around the rotating shaft thereof. Hence, by loosening the screws 164, it is possible to suitably adjust a rotational position where the carriage drive motor 25 is installed in the frame 14.

A connection part 166 is provided on the outer periphery of the carriage drive motor 25, and a flexible printed circuit cable 165 is connected to the connection part 166. In the connection part 166 of the carriage drive motor 25, a plurality of connection terminals 167 are provided, and the connection terminals 167 are projecting from the outer periphery of the carriage drive motor 25. In the disk apparatus 11, a control circuit is provided to output a control signal to the connection terminals 167 of the carriage drive motor 25. The lead screw 24 is rotated by the carriage drive motor 25 in accordance with the control signal output by the control circuit. The flexible printed circuit cable 165 is provided to connect the connection terminals 167 of the carriage drive motor 25 and the control circuit so that the control signal is supplied to the carriage drive motor 25 via the flexible printed circuit cable 165.

Figure 12:
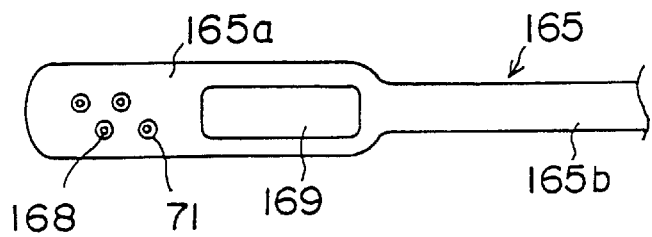
FIG. 12 is a top view of a flexible printed circuit cable.
Figure 13:
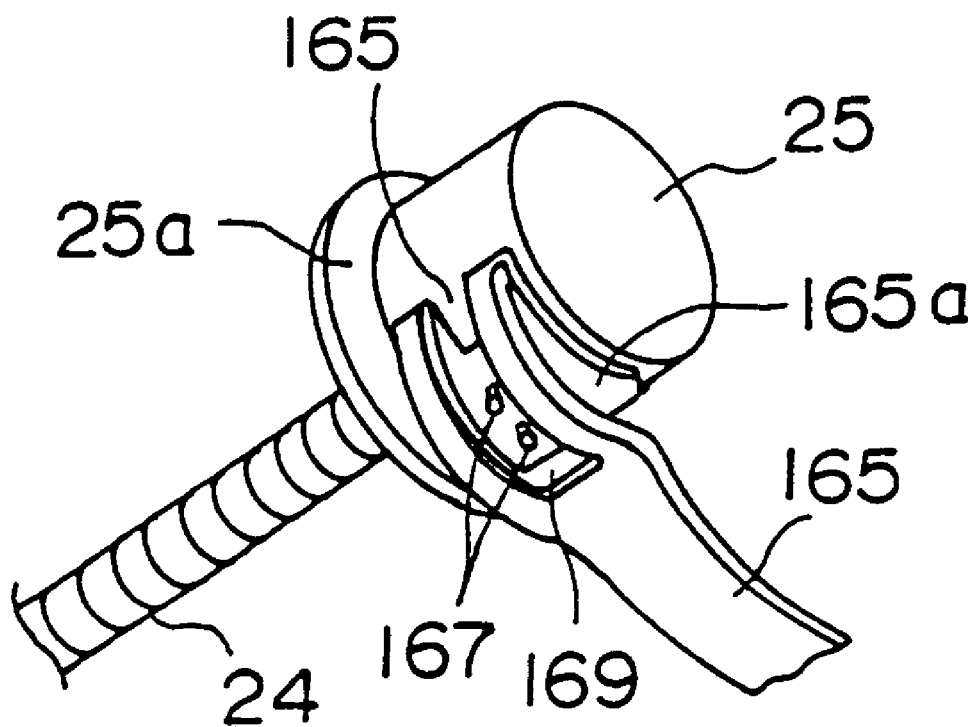
FIG. 13 is a perspective view of the flexible printed circuit cable and the carriage drive motor which are attached together.

FIG. 12 is a top view of the flexible printed circuit cable 165 in the disk apparatus 11. FIG. 13 is a perspective view of the flexible printed circuit cable 165 and the carriage drive motor 25 which are attached together.

In the flexible printed circuit cable 165, a first portion 165a, a second portion 165b, and a clearance opening 169 between the first portion 165a and the second portion 165b are provided. The first portion 165a is fixed to the outer periphery of the carriage drive motor 25 and has a corresponding number of through holes 168 through which the connection terminals 167 are passed. The second portion 165b is folded back from the first portion 165a at an end of the clearance opening 169 such that the connection terminals 167, projecting from the through holes 168 of the first portion 165a, are located within the clearance opening 169.

As shown in FIG. 12, in the flexible printed circuit cable 165, the first portion 165a is wider than the second portion 165b. The clearance opening 169 is configured to have a length and a width that are adequate to encircle the connection terminals 167 projecting from the through holes 168 after the second portion 165b is folded back from the first portion 165a at the end of the clearance opening 169.

In the flexible printed circuit cable 165, as shown in FIG. 12, an isolating resist material is removed from the outer periphery of each of the through holes 168, and an internal copper foil portion 71 is exposed there. During assembly, the flexible printed circuit cable 165 is soldered to the connection terminals 167 while the connection terminals 167 are passed through the through holes 168. After the soldering is performed, the second portion 165b is folded back from the first portion 165a mat the end of the clearance opening 169.

As shown in FIG. 13, the connection terminals 167, which are projecting from the through holes 168 of the first portion 165a, are located within the clearance opening 169. The clearance opening 169 has a length and a width that are adequate to encircle the connection terminals 167 projecting from the through holes 168, and the interference between the flexible printed circuit cable 165 and the connection terminals 167 of the carriage drive motor 25 can be avoided.

Accordingly, the disk apparatus 11 in which the flexible printed circuit cable 165 and the carriage drive motor 25 are attached together in the above-mentioned manner causes no interference between the flexible printed circuit cable 165 and the connection terminals 167. The disk apparatus 11 of the above-described embodiment is effective in safely preventing the interference between the flexible printed circuit cable 165 and the connection terminals 167 of the carriage drive motor 25 as in the conventional disk apparatus. In the above-described embodiment, it is unnecessary to shorten the connection terminals 167 of the carriage drive motor 25 by cutting off the connection terminal edges. In addition, it is possible for the disk apparatus 11 of the above-described embodiment to ensure good quality of soldering of the flexible printed circuit cable 165 and the connection terminals 167 with the efficiency of assembly operations needed for the disk apparatus 11 being maintained at the desired level.

In a conventional disk apparatus, the guide shaft is arranged such that the entire guide shaft is located outside the periphery of the disk. The guide shaft is provided on the side of the head carriage to guide the movement of the head carriage. In order to enable the head on the head carriage to be moved in the entire range from the innermost track to the outermost track of the disk, the longitudinal length of the head carriage in the conventional disk apparatus must be comparatively large. Because the conventional disk apparatus is provided with such a head carriage structure, it is difficult that a disk apparatus having a small size is produced.

Figure 14:
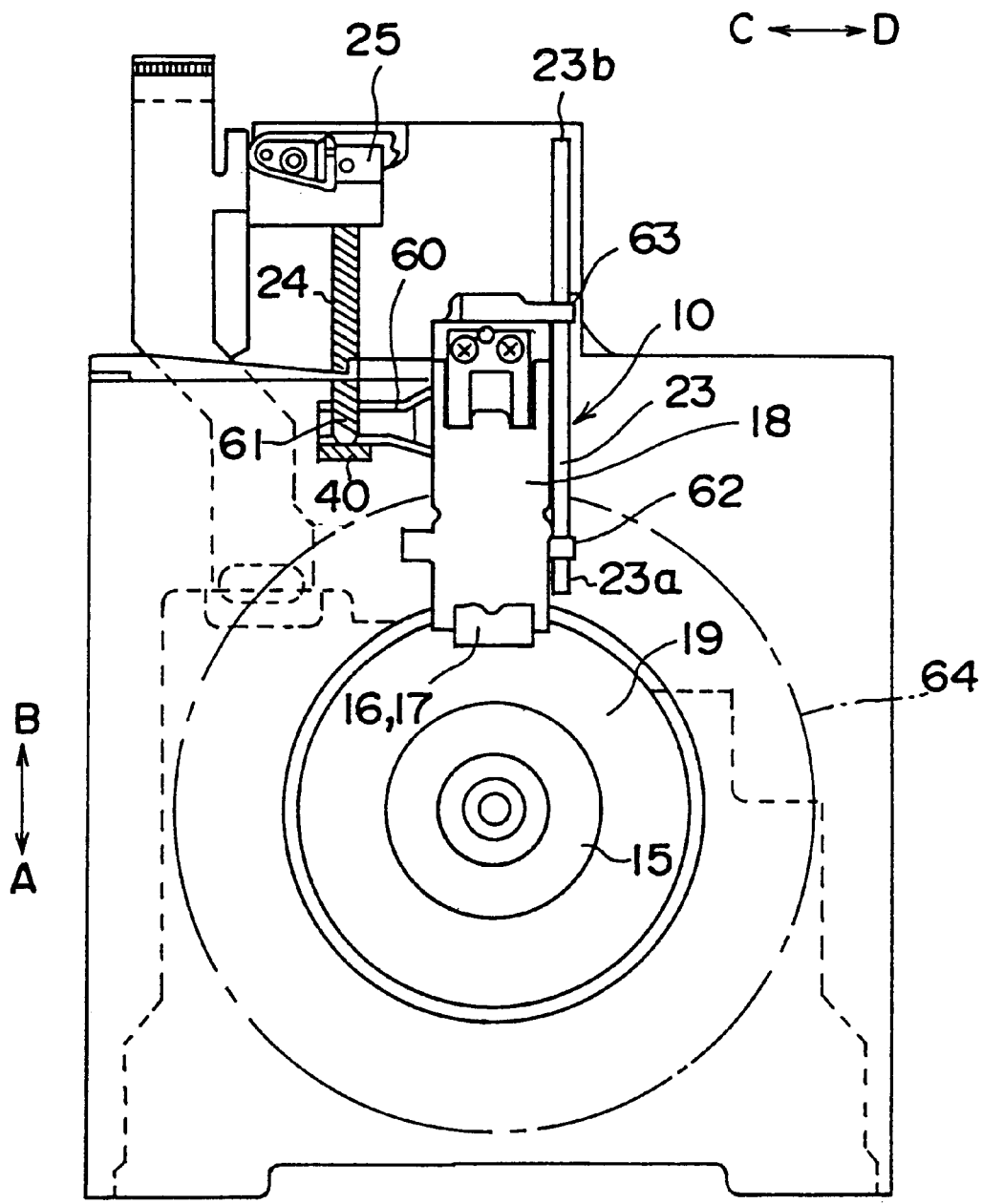
FIG. 14 is a top view of the frame in which the head carriage is moved to an inner position of the disk.

FIG. 14 is a top view of the frame 14 in which the head carriage 18 is moved to an inner position of the disk 64. The disk apparatus 11 of the present embodiment is configured to eliminate the above-mentioned problem of the conventional disk apparatus.

As shown in FIG. 14, in the head carriage 18, the guide shaft support 62 and the guide shaft support 63 are provided on the right side of the carriage base 21. The guide shaft 23 is supported at the first end 23a by the guide shaft support 62 and supported at the second end 23b by the guide shaft support 63. The guide shaft 23 is fitted to the guide shaft supports 62 and 63 such that the head carriage 18 is movable along the guide shaft 23 in one of the longitudinal directions A and B. When the lead screw 24 is rotated by the carriage drive motor 25, the head carriage 18 is moved in one of the longitudinal directions A and B via the connection of the head carriage 18 and the lead screw 24 by a distance according to a rotated angle of the lead screw 24.

In the head carriage structure of the present embodiment, the first end 23a of the guide shaft 23 and the guide shaft support 62 are extended to an inner position of the disk 64. Even when the head carriage 18 is moved to the innermost track of the disk 64, the head carriage 18 can be stably supported by the guide shaft support 62. The head carriage structure of the present embodiment is effective in reducing the longitudinal length of the head carriage 18. That is, the projecting length of the carriage mounting portion 14d of the frame 14 can be reduced. Hence, the head carriage structure of the present embodiment allows the disk apparatus 11 to have a small size while ensuring the movement of the head of the head carriage in the entire range from the innermost track to the outermost track of the disk.

Figure 15:
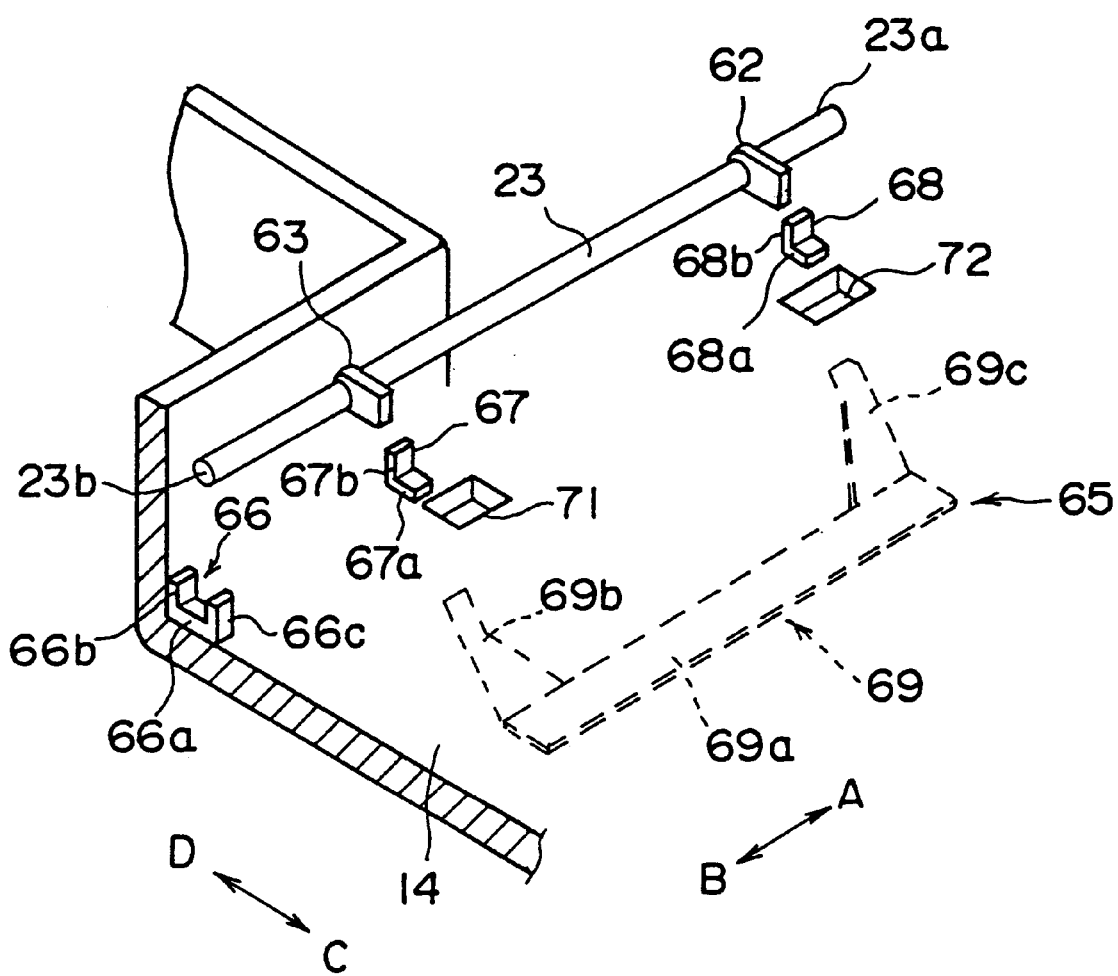
FIG. 15 is a perspective view of a retaining device which retains a guide shaft on the frame.
Figure 16:
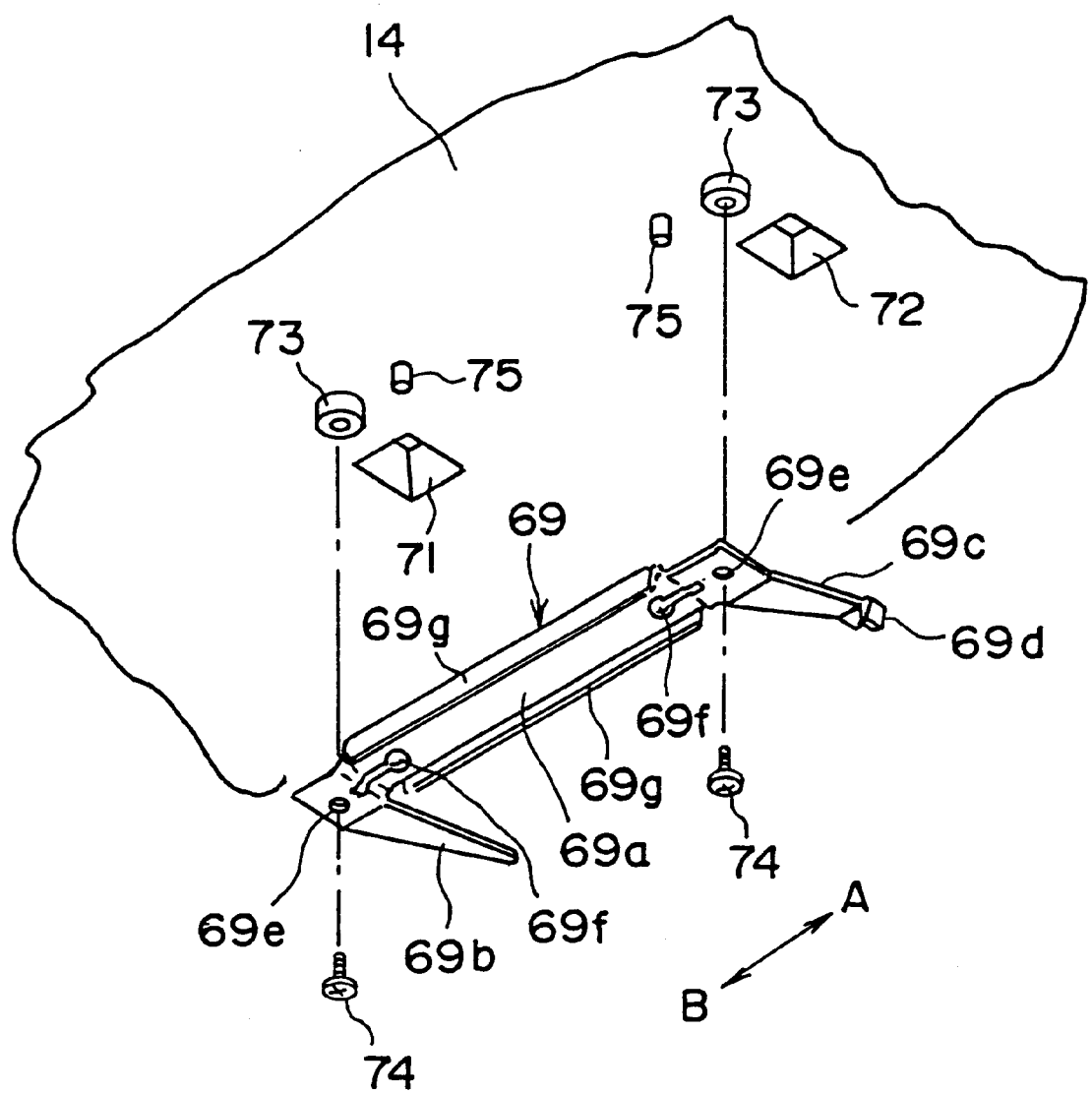
FIG. 16 is a perspective view of the retaining device under the frame.
Figure 17:
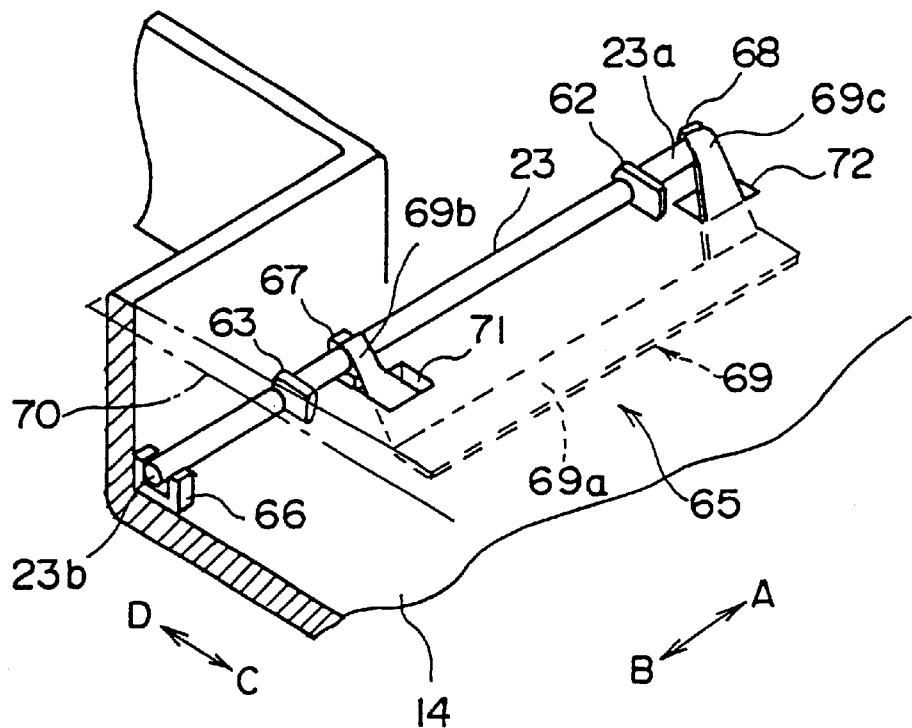
FIG. 17 is a perspective view of the guide shaft which is retained on the frame by the retaining device.

FIG. 15 is a perspective view of a retaining device 65 which retains the guide shaft 23 on the frame 14. FIG. 16 is a perspective view of the retaining device 65 under the frame 14. FIG. 17 is a perspective view of the guide shaft 23 which is retained on the frame 14 by the retaining device 65.

As shown in FIG. 15 through FIG. 17, the retaining device 65 is provided on the back surface of the frame 14 at a position corresponding to the position of the head carriage 18 on the top surface of the frame 18. Hence, the head carriage structure of the present embodiment is effective in providing a disk apparatus having a small size.

The retaining device 65 includes a first guide shaft base 68, a second guide shaft base 67, a third guide shaft base 66, and a pressing member 69. The guide shaft bases 66 through 68 are provided on the frame 14. The pressing member 69 presses the guide shaft 23 on the guide shaft bases 66 through 68. The guide shaft base 66 is formed in a U-shaped configuration and provided at the second end 23b of the guide shaft 23. The guide shaft base 66 includes a horizontal part 66a and a pair of raised walls 66b and 66c. The horizontal part 66a is fixed to the frame 14. The raised walls 66b and 66c hold the guide shaft 23 by interposing it between the raised wall 66b and the raised wall 66c.

The second end 23b of the guide shaft 23 is retained by the guide shaft base 66 at the three points on the horizontal part 66a and the raised walls 66b and 66c. In addition, the frame 14 includes an inner wall 70 indicated by the one-dot chain line in FIG. 17. The guide shaft 23 is brought into contact with the inner wall 70 while it is retained by the guide shaft base 66.

The guide shaft bases 67 and 68 are formed in an L-shaped configuration and fixed to the frame 14. The guide shaft base 67 is provided adjacent to the guide shaft support 63 which is located at an intermediate position of the guide shaft 23. The guide shaft base 68 is provided adjacent to the guide shaft support 62 which is located at the first end 23a of the guide shaft 23. In the frame 14, a rectangular through hole 71 is provided on the side of the guide shaft base 67, and a rectangular through hole 72 is provided on the side of the guide shaft base 68.

The guide shaft base 67 includes a horizontal part 67a and a raised wall 67b. The horizontal part 67a is fixed to the frame 14. The raised wall 67b holds the guide shaft 23 at the position opposite to the through hole 71. The guide shaft base 68 includes a horizontal part 68a and a raised wall 68b. The horizontal part 68a is fixed to the frame 14. The raised wall 68b holds the guide shaft 23 at the position opposite to the through hole 72.

As shown in FIG. 16, the pressing member 69 includes a main part 69a, a pair of arm parts 69b and 69c, and a stopper 69d. The frame 14 includes a pair of fixing portions 73 on the back surface of the frame 14. The main part 69a is secured to the frame 14 by fastening screws 74 to the fixing portions 73. In the main part 69a of the pressing member 69, a pair of reinforcing ribs 69g, a pair of holes 69e and a pair of locating holes 69f are provided. The screws 74 are passed through the holes 69e. The arm parts 69b and 69c are angled from the main part 69a, and passed through the through holes 71 and 72 of the frame 14 so as to extend upward from the top surface of the frame 14 as shown in FIG. 17. The stopper 69d is provided at the leading edge of the arm part 69c. Hence, the pressing member 69 presses the guide shaft 23 on the guide shaft bases 67 and 68 such that the guide shaft 23 is pressed on the raised walls 67b and 68b by the arm parts 69b and 69c of the pressing member 69.

Figure 18:
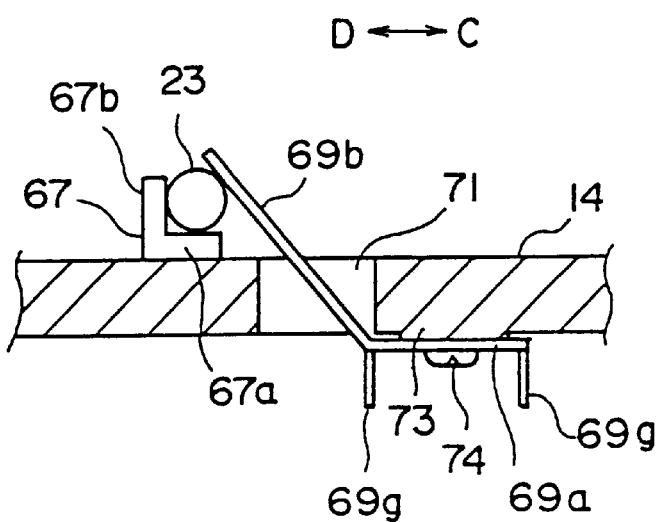
FIG. 18 is a cross-sectional view of the retaining device at an intermediate position where a second guide shaft base is provided.

FIG. 18 is a cross-sectional view of the retaining device 65 at the intermediate position where the second guide shaft base 67 is provided.

As shown in FIG. 18, the intermediate position of the guide shaft 23 is retained by the guide shaft base 67 and the pressing member 69 at the three points on the horizontal part 67a, the raised wall 67b and the arm part 69b.

Figure 19:
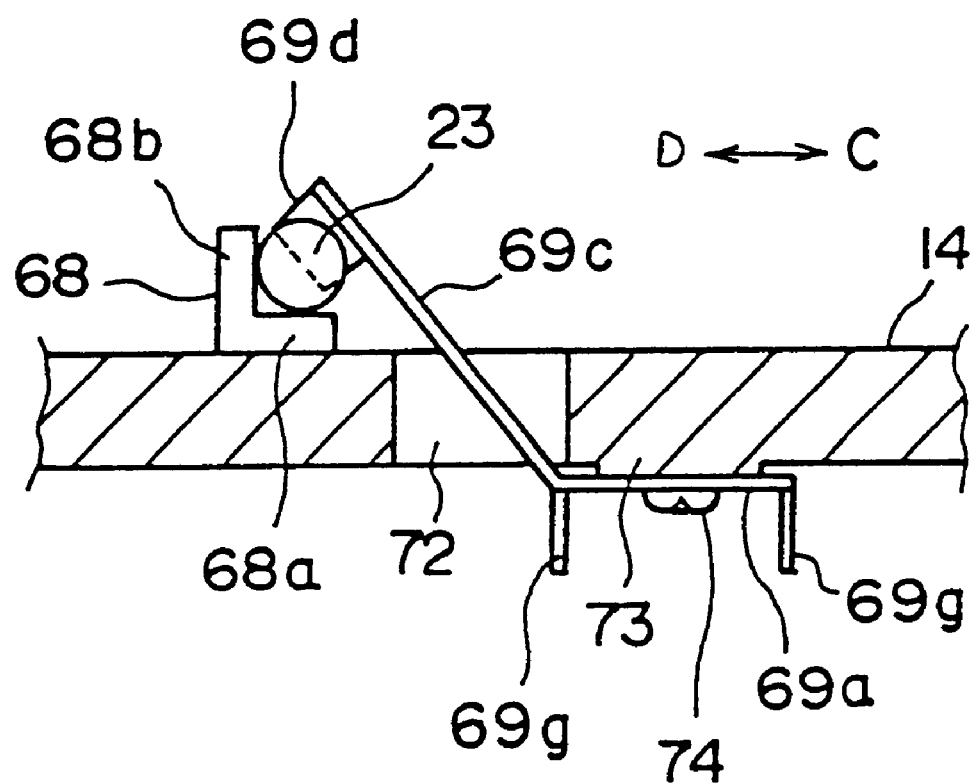
FIG. 19 is a cross-sectional view of the retaining device at an end position where a first guide shaft base is provided.

FIG. 19 is a cross-sectional view of the retaining device 65 at the end position where the first guide shaft base 68 is provided.

As shown in FIG. 16 and FIG. 19, the stopper 69d is provided at the leading edge of the arm part 69c of the pressing member 69, and the stopper 69d is brought into contact with the end surface of the guide shaft 23 on the side of the first end 23a. The end position of the guide shaft 23 is retained by the guide shaft base 68 and the pressing member 69 at the points on the horizontal part 68a, the raised wall 68b and the arm part 69c. Hence, the guide shaft 23 is brought into contact with the inner wall 70 at one end of the guide shaft 23 and with the stopper 69d at the other end of the a guide shaft 23 while it is retained by the retaining device 65.

As described above, in the head carriage structure of the present embodiment, the retaining device 65 is provided on the back surface of the frame 14 at the position corresponding to the position of the head carriage 18 on the top surface of the frame 18. Therefore, the head carriage structure of the present embodiment is effective in providing a disk apparatus having a small size.

Further, in a conventional disk apparatus, a retaining device, such as a leaf spring, which retains the guide shaft on the frame, is arranged on the side of the guide shaft. In the conventional disk apparatus, it is necessary to provide a mounting space where the retaining device is mounted, on the top surface of the frame at a side position of the head carriage where the guide shaft is provided. Because the conventional disk apparatus is provided with such a head carriage structure, it is difficult that a disk apparatus having a small size is produced.

In the head carriage structure of the present embodiment, the retaining device 65 is provided on the back surface of the frame 14 at the position corresponding to the position of the head carriage 18 on the top surface of the frame 18. The retaining device 65 includes the pressing member 69 having the arm parts 69b and 69c which are passed through the frame 14 so as to extend upward from the top surface of the frame 14. The pressing member 69 presses the guide shaft 23 on the guide shaft bases 67 and 68 such that the guide shaft 23 is pressed on the raised walls 67b and 68b by the arm parts 69b and 69c. It is unnecessary to provide a mounting space where the retaining device is mounted, on the top surface of the frame at a side position of the head carriage where the guide shaft is provided. Therefore, the head carriage structure of the present embodiment is effective in providing a disk apparatus having a small size.

In the above-described embodiment, the present invention is applied to a magnetic disk apparatus of the type in which a flexible-type magnetic disk is inserted. However, the present invention is not limited to the above-described embodiment. It is readily understood that the present invention is applicable to a disk apparatus of a different type in which a disk-form recording medium is inserted.

Further, the present invention is not limited to the above-described embodiment, and variations and modifications may be made without departing from the scope of the present invention.

What is claimed is:
1. A disk apparatus comprising:
   a head carriage having a read/write head which reads information from or writes information to a disk; the head carriage provided to support the head thereon such that the head can be positioned to the disk in a radial direction of the disk together with the head carriage;

a carriage drive motor provided to move the head carriage in the radial direction of the disk in accordance with a control signal, the carriage drive motor having a number of connection terminals on an outer periphery of the motor;

a guide shaft provided to guide the movement of the head carriage; and a flexible printed circuit cable provided to supply the control signal to the connection terminals of the carriage drive motor, wherein the flexible printed circuit cable has a first portion, a second portion and a clearance opening therebetween, the first portion being fixed to the outer periphery of the motor and having a corresponding number of through holes through which the connection terminals are passed, and the second portion being folded back from the first portion at an end of the clearance opening such that the connection terminals, projecting from the through holes of the first portion, are located within the clearance opening, wherein the clearance opening of the flexible printed circuit cable is disposed to pass through the connection terminals of the carriage drive motor, causing no interference between the flexible printed circuit cable and the connection terminals.

2. The disk apparatus according to claim 1, wherein the flexible printed circuit cable is configured such that the clearance opening has a length and a width that are adequate to encircle the connection terminals, projecting from the through holes, after the second portion is folded back from the first portion.

3. The disk apparatus according to claim 1, wherein the flexible printed circuit cable is configured such that the first portion is wider than the second portion.

4. The disk apparatus according to claim 1, further comprising a frame and a retaining device, the retaining device provided to retain the guide shaft on a top surface of the frame, the retaining device being arranged on a back surface of the frame at a position corresponding to a position of the head carriage on the top surface of the frame, said retaining device having at least one arm portion projecting through said frame from said back surface to said top surface thereof for retaining said guide shaft.

5. The disk apparatus according to claim 4, wherein the retaining device including a pressing member having a main part and a pair of arm parts, the arm parts being angled from the main part and passed through the frame so as to extend upward from the top surface of the frame.

6. The disk apparatus according to claim 5, wherein the main part of the pressing member is fixed to the back surface of the frame.

7. A disk apparatus comprising:

a frame;

a head carriage having a read/write head which reads information from or writes information to a disk, the head carriage provided to support the head thereon such that the head can be positioned to the disk in a radial direction of the disk together with the head carriage;

a carriage drive motor provided to move the head carriage in the radial direction of the disk in accordance with a control signal;

a guide shaft provided to guide the movement of the head carriage, the guide shaft having a first end extended to an inner position of the disk;

a guide shaft support provided to support the guide shaft at the first end, the guide shaft support being arranged at a position adjacent to the inner position of the disk; and a retaining device provided to retain the guide shaft on a top surface of the frame, the retaining device being arranged on a back surface of the frame at a position corresponding to a position of he head carriage on the top surface of the frame, said retaining device having at least one arm portion projecting through said frame from said back surface to said top surface thereof for retaining said guide shaft.

8. A disk apparatus comprising:

a frame;

a head carriage having a read/write head which reads information from or writes information to a disk, the head carriage provided to support the head thereon such that the head can be positioned to the disk in a radial direction of the disk together with the head carriage;

a carriage drive motor provided to move the head carriage in the radial direction of the disk in accordance with a control signal;

a guide shaft provided to guide the movement of the head carriage; and a retaining device provided to retain the guide shaft on a top surface of the frame, the retaining device including a pressing member having a main part mounted on a back surface of said frame and a pair of arm parts, the arm parts being angled from the main part and passed through the frame from the back surface thereof so as to extend upward from the top surface of the frame.

9. The disk apparatus according to claim 8, wherein the main part of the pressing member is fixed to a back surface of the frame.

* * * * *